US010649670B2

(12) United States Patent
Liu et al.

(10) Patent No.: US 10,649,670 B2
(45) Date of Patent: May 12, 2020

(54) DATA BLOCK PROCESSING

(71) Applicant: International Business Machines Corporation, Armonk, NY (US)

(72) Inventors: Liang Liu, Beijing (CN); Junmei Qu, Beijing (CN); Hong Zhou Sha, Beijing (CN); Wei Zhuang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 53 days.

(21) Appl. No.: 15/268,151

(22) Filed: Sep. 16, 2016

(65) Prior Publication Data

US 2018/0081566 A1   Mar. 22, 2018

(51) Int. Cl.
*G06F 8/65* (2018.01)
*G06F 12/08* (2016.01)
(Continued)

(52) U.S. Cl.
CPC ............ *G06F 3/0613* (2013.01); *G06F 3/064* (2013.01); *G06F 3/067* (2013.01); *G06F 9/5027* (2013.01);
(Continued)

(58) Field of Classification Search
CPC ........ G06F 3/065; G06F 3/0619; G06F 3/067; G06F 2221/0773; G06F 3/064;
(Continued)

(56) References Cited

U.S. PATENT DOCUMENTS

| 8,745,626 B1* | 6/2014 | Sandstrom | G06F 9/5027 |
| | | | 718/102 |
| 8,775,125 B1* | 7/2014 | Aguiling | G06F 11/3433 |
| | | | 702/186 |

(Continued)

FOREIGN PATENT DOCUMENTS

CN    104360903 A    2/2015

OTHER PUBLICATIONS

Caino-Lores et al., "A Survey on Data-Centric and Data-Aware Techniques for Infrastructures", World Academy of Science, Engineering and Technology, International Journal of Computer, Electrical, Automation, Control and Information Engineering, vol. 10, No. 3, 2016, Publication Date: Feb. 1, 2016, pp. 455-461.

(Continued)

*Primary Examiner* — Mohamed M Gebril
(74) *Attorney, Agent, or Firm* — Scully, Scott, Murphy & Presser, P.C.; Joseph Petrokaitis, Esq.

(57) ABSTRACT

Embodiments of the present disclosure relates to data block processing in a distributed processing system. According to one embodiment of the present disclosure, a computer-implemented method is proposed. A first performance indicator for processing a data block by a first processing module is obtained, where the data block is loaded into the first processing module. Then, a second performance indicator for processing the data block by a second processing module is obtained, where the first and second processing modules being logical instances launched in a distributed processing system for processing data blocks. Next, one (Continued)

processing module is selected from the first and second processing modules for processing the data block based on a relationship between the first and second performance indicators.

19 Claims, 4 Drawing Sheets

(51) Int. Cl.
*G06F 13/00* (2006.01)
*G06F 3/06* (2006.01)
*G06F 9/50* (2006.01)

(52) U.S. Cl.
CPC ...... *G06F 3/0635* (2013.01); *G06F 2209/501* (2013.01)

(58) Field of Classification Search
CPC ...... G06F 21/10; G06F 21/6209; G06F 21/64; G06F 3/0604; G06F 11/1448; G06F 17/30312; G06F 21/105; G06F 3/061; G06F 3/0689
USPC ........................................................ 711/154
See application file for complete search history.

(56) References Cited

U.S. PATENT DOCUMENTS

| | | | |
|---|---|---|---|
| 9,069,610 B2 | 6/2015 | Chakravorty et al. | |
| 9,223,626 B2 | 12/2015 | Factor et al. | |
| 9,285,991 B2* | 3/2016 | Alatorre | G06F 3/0605 |
| 9,331,943 B2* | 5/2016 | Yeddanapudi | H04L 47/11 |
| 9,411,645 B1* | 8/2016 | Duan | G06F 9/4887 |
| 2002/0090128 A1* | 7/2002 | Naftali | G01N 21/9501 |
| | | | 382/149 |
| 2006/0075265 A1* | 4/2006 | Hamaoka | G06F 1/3203 |
| | | | 713/300 |
| 2008/0046895 A1* | 2/2008 | Dillenberger | G06F 9/505 |
| | | | 718/105 |
| 2009/0019449 A1* | 1/2009 | Choi | G06F 9/5088 |
| | | | 718/105 |
| 2012/0278511 A1* | 11/2012 | Alatorre | G06F 3/0605 |
| | | | 710/33 |
| 2013/0332935 A1* | 12/2013 | Varma | G06F 9/5011 |
| | | | 718/104 |
| 2014/0007239 A1* | 1/2014 | Sharpe | G06F 21/561 |
| | | | 726/24 |
| 2015/0074216 A1* | 3/2015 | Park | H04L 67/10 |
| | | | 709/208 |
| 2015/0207706 A1 | 7/2015 | Li et al. | |
| 2015/0277791 A1* | 10/2015 | Li | G06F 3/0689 |
| | | | 711/114 |
| 2015/0286748 A1 | 10/2015 | Lilley | |
| 2016/0342445 A1* | 11/2016 | van der Lugt | G06F 16/24 |
| 2017/0289240 A1* | 10/2017 | Ghare | H04L 65/4069 |
| 2017/0344597 A1* | 11/2017 | Wang | G06F 16/182 |

OTHER PUBLICATIONS

Zaharia et al., "Spark: Cluster Computing with Working Sets", Electrical Engineering and Computer Sciences, University of California at Berkeley, Technical Report No. UCB/EECS-2010-53, May 7, 2010, pp. 1-7.

Wu et al., "Composable and Efficient Functional Big Data Processing Framework", 2015 IEEE International Conference on Big Data, Oct. 29-Nov. 1, 2015, Santa Clara, CA, USA, pp. 279-286.

Zaharia et al., "Resilient Distributed Datasets: A Fault-Tolerant Abstraction for In-Memory Cluster Computing", Electrical Engineering and Computer Sciences, University of California at Berkeley, Technical Report No. UCB/EECS-2011-82, Jul. 19, 2011, pp. 1-15.

* cited by examiner

DATA BLOCK PROCESSING

BACKGROUND

With the development of distributed data storage technology, a data storage system is no longer limited to being locally deployed on a single storage device, but may be disposed at any physical position that is accessible to a user via a network. Meanwhile, a large data object may be divided into small data blocks and then stored on multiple storage devices. Further, multiple copies of each data block of the data object may be stored on different devices in a distributed data storage system so as to increase the reliability. If one storage device crashes, the copy stored on the crashed storage device may be recovered from other storage devices.

Data distribution among multiple storage devices is also important for distributed data processing. In a distributed processing system, data processing may be implemented on multiple devices, thereby the small data blocks may be read by different processing device for the processing. Then the processed result of each small data block may be integrated into a final result.

SUMMARY

In one aspect, a computer-implemented method is proposed. According to the method, a first performance indicator for processing a data block by a first processing module is obtained, where the data block is loaded into the first processing module. Then, a second performance indicator for processing the data block by a second processing module is obtained, where the first and second processing modules being logical instances launched in a distributed processing system for processing data blocks. Next, one processing module is selected from the first and second processing modules for processing the data block based on a relationship between the first and second performance indicators.

In another aspect, a computing system is proposed. The computing system comprises a computer processor coupled to a computer-readable memory unit, the memory unit comprising instructions that when executed by the computer processor implements a method. In the method, a first performance indicator for processing a data block by a first processing module is obtained, where the data block is loaded into the first processing module. Then, a second performance indicator for processing the data block by a second processing module is obtained, where the first and second processing modules being logical instances launched in a distributed processing system for processing data blocks. Next, one processing module is selected from the first and second processing modules for processing the data block based on a relationship between the first and second performance indicators.

In yet another embodiment, a computer program product is proposed. The computer program product is tangibly stored on a non-transient machine readable medium and comprising executable instructions which, when executed on an electronic device, cause the electronic device to: obtain a first performance indicator for processing a data block by a first processing module, the data block being loaded into the first processing module; obtain a second performance indicator for processing the data block by a second processing module, the first and second processing modules being logical instances launched in a distributed processing system for processing data blocks; and select one from the first and second processing modules for processing the data block based on a relationship between the first and second performance indicators.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
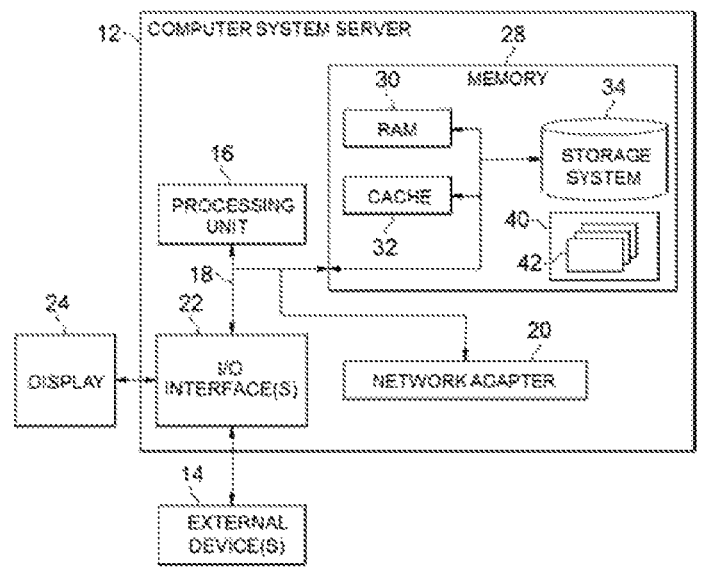
FIG. 1 schematically illustrates an example computer system/server 12 which is applicable to implement embodiments of the present disclosure.

Referring now to FIG. 1, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is appreciated that the computer system/server 12 as illustrated in FIG. 1 is only an example of the computing device in which the embodiments of the present disclosure may be implemented. In one embodiment, the data nodes in the distributed processing system and the distributed storage system may have similar configuration of the computer system/server 12.

Some approaches have been proposed for distributed computing and parallelizing the computing procedures among multiple modules in the distributed processing system. In an example distributed processing system such as Apache® Spark, each data block in the data object may be retrieved from a corresponding storage device and then is processed to obtain a temporary result. After that, the temporary results of all the data blocks in the data object may be further integrated into a final result.

With the above approaches, although data blocks may be processed by different modules in parallel, the parallel processing may result in additional resources cost on the modules besides the normal resource consumption. In other words, once a module with a long to-do list is assigned to process a data block, the data block has to wait until the to-do list is cleaned. Further, the performance of processing each data block included in the data object depends on various factors. As a result, the time cost for processing the data object according to these approaches depends on the weakest module, thereby a low efficiency in processing the data object may be caused.

Figure 2:
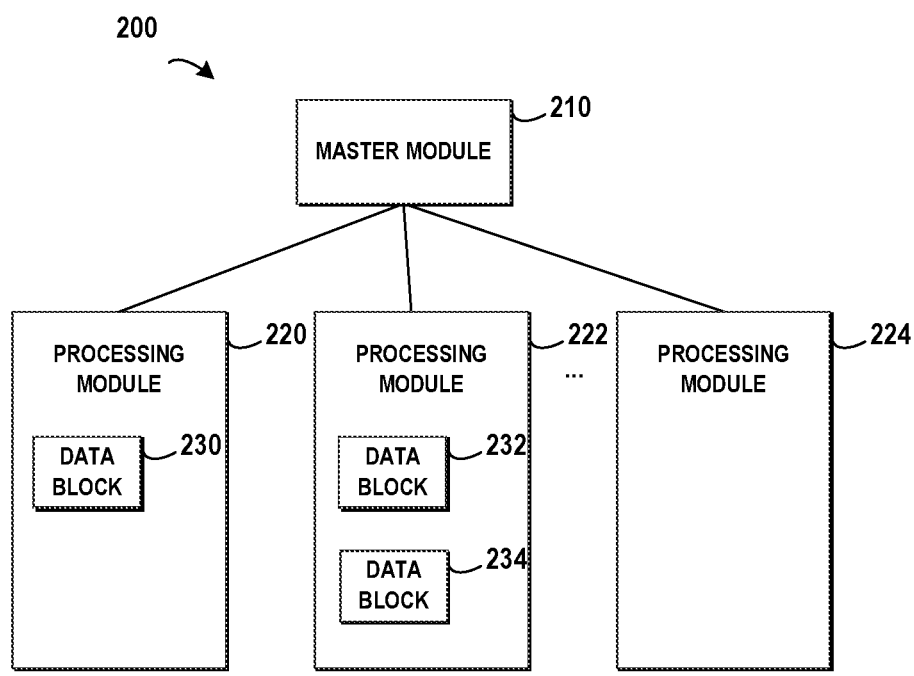
FIG. 2 schematically illustrates an example distributed processing system in which one embodiment of the present disclosure may be implemented.

FIG. 2 schematically illustrates an example distributed processing system 200 in which one embodiment of the present disclosure may be implemented. As illustrated in FIG. 2, a master module 210 is provided for controlling a plurality of processing modules 220, 222, . . . , and 224. In the context of the present disclosure, the processing module may also be a logical instance launched in the distributed processing system 200 for processing the data block. In FIG. 2, a data block 230 is loaded into the processing module 220, and data blocks 232 and 234 are loaded into the processing module 222. In this example, the data blocks 230, 232 and 234 are included in a data object that is to be processed. Although it is not illustrated in FIG. 2, the data object may include one or more other data blocks.

For example, there are 1000 workers in a factory, and the production quantity of the 1000 workers is recorded in the data object. Due to the great size of the production quantity, the data object may be divided into a plurality of data blocks (such as the data blocks 230, 232, and so on). In calculating the total production quantity of the 1000 workers, the processing module may calculate a sum of each data block and then the calculated sums may be added up to obtain a total sum of the production quantity.

In FIG. 2, the processing module 220 is loaded with the only data block 230 and thus it may be processed immediately after being loaded. The processing module 222 is loaded with two data blocks and thus the data block 234 have to wait for its turn until the data block 232 has been processed. Meanwhile, the processing module 224 is loaded with nothing and thus may be in an idle state. In FIG. 2, tasks for processing the data blocks are tilted because of uneven distribution of data blocks, and the workload need to be balanced among the processing modules 220-224.

Some approaches are proposed for balancing the workload. In one approach, a timeout threshold is set in the distributed processing system, and if the time cost for one data block is longer than the time threshold, then it may indicate that the module which is processing the data block is heavily loaded, thereby the module may be stopped and the task for processing the data block may be rescheduled to another lightly loaded module such as an idle module.

Although this approach may balance the workload among multiple processing modules to a certain extent, it is difficult to set an appropriate timeout threshold. If the threshold is defined as a relative great value, then the distributed processing system may spend a long time waiting before it realizes that the module to which the data block is assigned is heavily loaded, and thus the response time may increase. On the other hand, if the threshold is set to a relative small value, then the data block meets a timeout may be frequently rescheduled to another module before the processing is finished by the current module to which the data block is assigned.

In view of the above, one embodiment of the present disclosure proposes a computer-implemented method. In the method, a first performance indicator for processing a data block by a first processing module is obtained, where the data block is loaded into the first processing module. Then, a second performance indicator for processing the data block by a second processing module is obtained, where the first and second processing modules are logical instances launched in a distributed processing system for processing data blocks. Next, one processing module is selected from the first and second processing modules for processing the data block based on a relationship between the first and second performance indicators.

Figure 3:
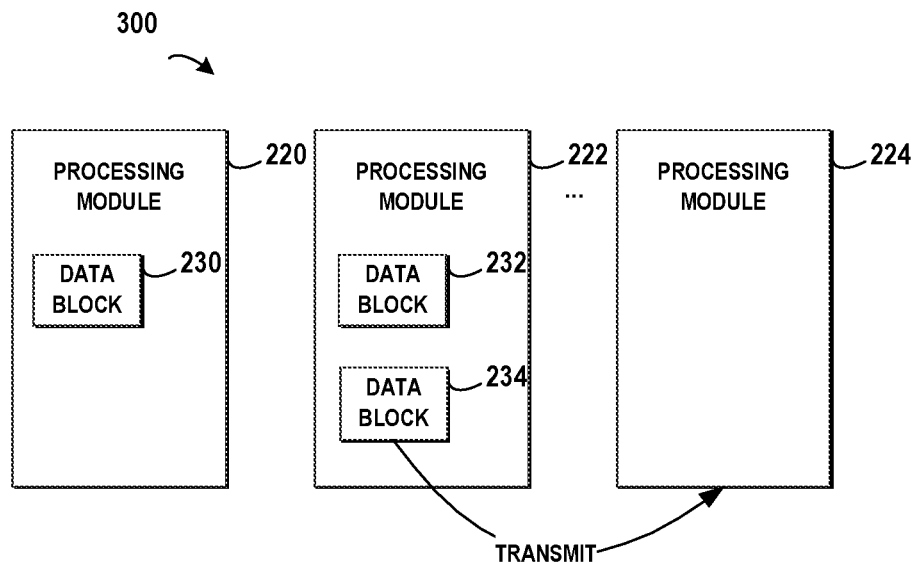
FIG. 3 schematically illustrates a block diagram for processing a data block according to one embodiment of the present disclosure.

FIG. 3 schematically illustrates a block diagram for processing a data block according to one embodiment of the present disclosure. The processing modules 220, 222 and 224 are launched in a distributed processing system, where the data block 230 is loaded in the processing module 220, the data blocks 232 and 234 are loaded in the processing module 222, while the processing module 224 is in an idle state. At this point, the data blocks 232 and 234 are queued and waiting for being processed. Considering the time delay caused by the queued data blocks 232 and 234 as well as the idle processing module 224, the embodiment proposes a method for transmitting the queued data block 234 to the idle processing module 224, so as to offload the queued task to the capable processing module.

Before the transmitting, the costs for processing the data block 234 by the processing modules 222 and 224 may be estimated, and then the one with a lower cost may be selected from the processing modules 222 and 224 respectively for the further processing. If the processing module 222 is selected, then the data block 234 will continue waiting in the queue; otherwise if the idle processing module 224 is selected, then the data block 234 will be transmitted to the processing module 224.

In general, the embodiment may select a faster processing module and balance the workload among the multiple processing modules in a distributed processing system, which can improve the distributed processing and parallelization of the processing procedures among multiple processing modules in the distributed processing system.

Figure 4:
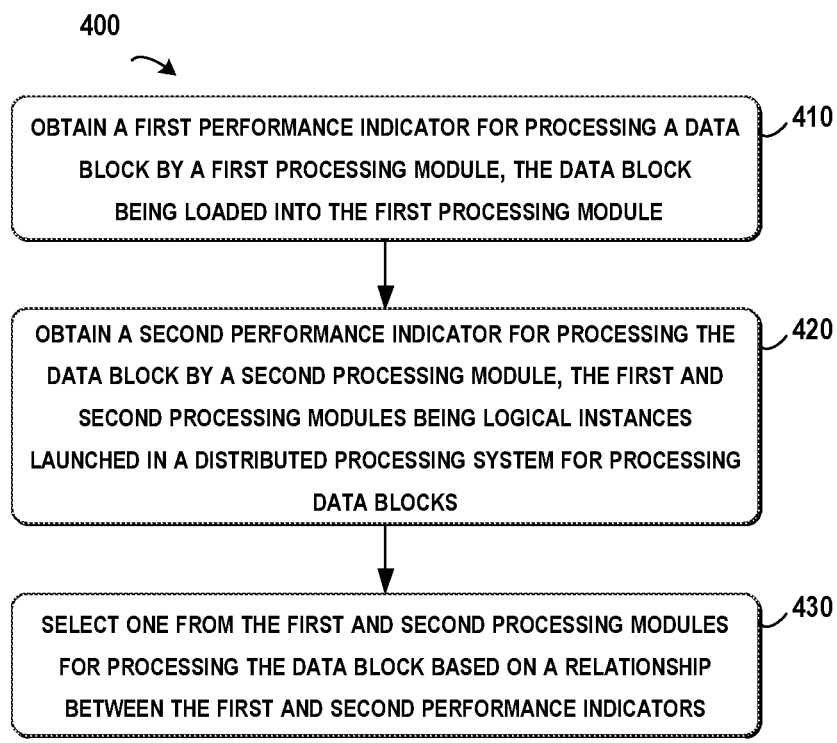
FIG. 4 schematically illustrates a flowchart of a method for processing a data block according to one embodiment of the present disclosure.

More details of the embodiments of the present disclosure will be discussed with reference to FIGS. 4-8 hereinafter. FIG. 4 schematically illustrates a flowchart 400 of a method for processing a data block according to one embodiment of the present disclosure. In Step 410, a first performance indicator for processing a data block by a first processing module is obtained, where the data block is loaded into the first processing module. The performance indicator may indicate the performance for processing the data block, and it may be measured for example by the time cost for processing the data block. In this step, as the data block has already been loaded into the first processing module, the time cost may be associated with the time for processing the data block by the first processing module.

Then, in Step 420, a second performance indicator for processing the data block by a second processing module is obtained. In this step, the first and second processing modules are logical instances launched in a distributed processing system for processing data blocks. In this step, as the data block is still in the first processing module, the data block has to be loaded into the second processing module first before it is processed by the second processing module. Accordingly, the second performance indicator may be associated with the time for transmitting the data block from the first processing module to the second one, as well as the time for processing the data block by the second processing module.

Next, in Step 430, one processing module is selected from the first and second processing modules for processing the data block based on a relationship between the first and second performance indicators. In this step, by comparing the first and the second performance indicators, one module which may process the data block in a faster way may be selected for the further processing.

In one embodiment of the present disclosure, the first performance indicator may be calculated based on a processing performance indicator of the data block, where the processing performance indicator is associated with at least one of a size of the data block and a complexity of operations included in processing the data block.

In a distributed processing system, the data block may be of various sizes according to a predefined rule. The larger the size is, the longer the processing time is. Further, various type of operations are supported in the distributed processing system and the complexities of these types may be different. At this point, the complexity of the operation may be considered in calculating the performance indicator. The higher the complexity is, the longer the performance time is. In this embodiment, the processing performance indicator may be represented by Equation 1:

$$\text{Processing Performance Indicator} = \alpha_1 * DS + \alpha_2 * \text{Set(operators)} \quad (1)$$

In the above Equation 1, DS indicates a size of the data block, Set <operators> indicates the complexity of the operation/operations included in processing the data block, and $\alpha_1$ and $\alpha_2$ may be predefined constant numbers, for example, predefined by an administrator of the distributed processing system according to the previous experience. In one embodiment of the present disclosure, the complexity may be represented by an accumulation of respective weights predefined for the respective operations. For example, if two operations "splitting" and "grouping" with the weights of "1" and "2" are involved in processing the data block, then the accumulation may be calculated as 1+2=3. In another embodiment, those skilled in the art may adopt another manner for calculating the complexity.

In this example, the first performance indicator as described in Step 410 for processing the data block by the first processing module in a local manner may be determined according to Equation 2:

$$\text{Performance}_{local} = \quad (2)$$
$$\text{Processing Performance Indicator} = \alpha_1 * DS + \alpha_2 * \text{Set}\langle\text{operators}\rangle$$

In Equation 2, Performance$_{local}$ indicates the performance for processing the data block by the first processing module locally, and the Processing Performance Indicator may be calculated according to Equation 1 as defined in the preceding paragraphs in the disclosure.

In one embodiment of the present disclosure, the second performance indicator may depend on the processing performance indicator and a transmitting performance indicator of the data block, where the transmitting performance indicator may be associated with performance for transmitting the data block to a processing module by which the data block is to be processed.

In this embodiment, the transmitting performance indicator may be calculated based on the traffic state of the network between the first and second processing modules. For example, the transmitting performance indicator may be calculated based on the total bandwidth and the occupied bandwidth according to Equation 3. Alternatively, those skilled in the art may adopt any solution for estimating the transmitting performance.

$$\text{Transmitting Performance Indicator} = \quad (3)$$
$$\alpha_3 * \frac{DS}{\text{Bandwidth}_{base} - \text{Bandwidth}_{occupied}}$$

Where DS indicates the size of the data block, and $\alpha_a$ may be predefined constant numbers, for example, predefined by an administrator of the distributed processing system according to the previous experience. Further, Bandwidth$_{base}$ indicates the base bandwidth supported by the network, Bandwidth$_{occupied}$ indicates the bandwidth that is occupied in the network, and these bandwidths may be determined from the configuration of the network and the traffic in the network. In this example, the second performance indicator as described in Step 420 for processing the data block in a network manner may be determined according to Equation 4:

$$\text{Performance}_{network} = \text{Transmitting Performance Indicator} = \quad (4)$$
$$\alpha_3 * \frac{DS}{\text{Bandwidth}_{base} - \text{Bandwidth}_{occupied}}$$

In Equation 4, indicates the performance for processing the data block by the second processing module via the network, and the Transmitting Performance Indicator may be calculated according to Equation 3 as defined in the preceding paragraphs in the disclosure.

In calculating, the performance indicator may be measured by a time cost for processing the data block. For example, it is determined that the first processing module may finish the processing within 10 seconds and the second processing module may finish the processing within 5 seconds. As the data block is not in the second processing module and thus the time for transmitting the data block to the second processing module needs to be considered. If the time cost for transmitting is 3 seconds, then the second module may finish the processing within 5+3=8 seconds. At this point, the performance of the second processing module is higher than that of the first processing module (8<10), the second processing module may be selected. In another example, if the second processing module needs 8 seconds to finish the task, then the first processing module may be selected because the total performance of the second processing module (3+8=11 seconds) is lower than that of the first processing module (10 seconds).

In one embodiment of the present disclosure, the performance indicator may be represented by an amount of the computing resource that is to be consumed for processing the data block (for example, the CPU resource, the memory resource or the bandwidth resource). In addition to and/or alternatively, the performance indicator may be represented by a data processing rate (for example, in a unit of MB/s). And those skilled in the art may work out other equations for measuring the performance based on the above principle of the embodiment.

In one embodiment of the present disclosure, if the processing module is busy in a current task for processing another data block, then the to-be-processed data block must wait before the processing module finishes the current task. Further, if a further to-be-processed data block is already in the waiting queue, then the processing module may process the to-be-processed data block after it has processed all the data blocks in the queue. At this point, the waiting time may be considered in calculated the performance indicator of the data block. Continuing the above example, with respect to the first processing module, if there are 3 data blocks in the queue then the first performance indicator may be represented as 10*3+10=40 seconds. With respect to the second processing module, if 2 data blocks are waiting and the time cost for processing one data block is 8 seconds, then the second performance indicator may be represented as 8*2+8+3=27 seconds. In this example, the second processing module may be selected for processing the data block.

Figure 5:
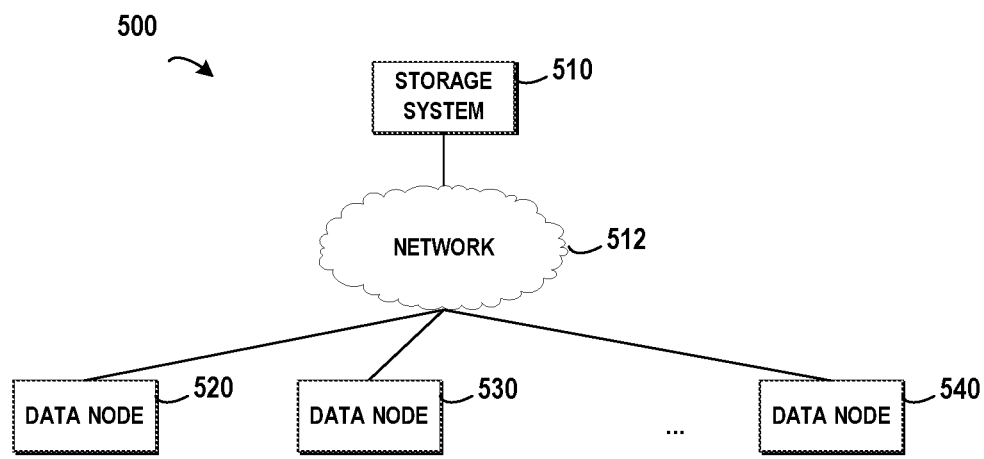
FIG. 5 schematically illustrates a block diagram of an example distributed storage system according to one embodiment of the present disclosure.

In a distributed processing system, usually the data blocks are stored in different data nodes in the storage system. Further, there may be multiple copies of these data blocks across these data nodes to increase the reliability of the storage system. FIG. 5 schematically illustrates a block diagram of an example distributed storage system according to one embodiment of the present disclosure.

As illustrated in FIG. 5, a storage system 510 is distributed among a data node 520, a data node 530, . . . , and a data node 540 via a network 512. Each of these data nodes comprises one or more storage devices for storing data. It would be appreciated that the present disclosure does not concern the physical locations of the data nodes, and these data nodes may be located at same or different physical locations. For example, the data node 520 may be located at a data center in City A, while the data node 530 may be located at another data center in a different City B. Further, the embodiments of the present disclosure may be implemented in connection with any types of data nodes. For example, one or more data nodes may be implemented by storage servers comprising multiple physical disks. Alternatively, or in addition, one or more data nodes may be implemented by virtual storage servers comprising multiple virtual storage disks.

The distributed storage system 510 in FIG. 5 may provide higher data storage capacity and increased data reliability for the user. A single storage device may not provide space for holding a huge data object (for example, 100 Gigabyte). With the above distributed storage system, the data object may be divided into multiple data blocks (for example, each data block may be of 1 Gigabyte). Then the 100 data blocks may be distributed among a plurality of data nodes, with each data node storing one or more data blocks.

In this example, more than one copy of the data object may be stored in order to deal with a crash in the distributed storage system, and the data blocks of each copy may be distributed among multiple data nodes. When two copies of the data object are stored in the distributed storage system 510, the data blocks 1-100 of the first copy may be stored in the data node 520, and the data blocks 1-100 of the second copy may be stored in the data node 530. Further, if the distributed storage system is implemented according to a Hadoop architecture, three copies of the data object may be stored. For example, each of the data nodes 520, 530, and 540 may hold the data blocks of one copy of the data object.

In order to further increase the processing of the data block, a loading performance for loading the data block into the corresponding processing module may be considered. For example, a faster data node may be selected from a plurality of data nodes that store copies of the data block, and then the copy stored in the faster data node may be loaded into first processing module in a faster manner. In this example, a data node with adequate resources and high communication bandwidth with the processing module may be taken as a fast data node.

In one embodiment of the present disclosure, a plurality of data nodes that store copies of the data block may be identified; then a data node with a loading performance indicator better than that of at least one of remaining data nodes in the plurality of data nodes may be selected from the plurality of data nodes; next the data block may be loaded into the first processing module by reading a copy of the data node stored in the selected data node. In this embodiment, it may take full advantage of the resources of the data node on which multiple copies of the data blocks included in a data object are stored.

Referring to FIG. 5, given three copies of the data block are stored in the data node 520, 530 and 540 respectively, then a faster data node may be selected from the three data nodes. For example, if data node 520 is equipped with powerful hardware and has better bandwidth, then the copy stored in the data node 520 may be loaded into the first processing module.

In one embodiment of the present disclosure, the loading performance indicator may be associated with at least one of an Input/Output state, a memory state, and a CPU state of a data node in which a copy of the data block is stored. In this embodiment, the Input/Output state may be measured by an available I/O resource of the disk in the data node, the memory state may be measured by an available memory resource in the data node, and the CPU state may be measured by an available CPU resource of the CPU in the data node.

The CPUs of the data nodes are usually made by different providers and have different types. Generally, the computing power of a CPU may depend on the frequency of the core in the CPU, the number of the cores provided in the CPU, and the usage of the CPU. Accordingly, the CPU state may be measured from the above aspects. For example, features of the CPUs are illustrated in Table 1 as below:

TABLE 1

Features of CPUs

| Feature | CPU of Data Node 1 | CPU of Data Node 2 |
| --- | --- | --- |
| Frequency | 2 GHz | 1 GHz |
| Number of Cores | 4 | 2 |
| Usage | 20% | 60% |

In one embodiment of the present disclosure, a benchmark may be defined for measuring the CPU performance. For example, a CPU with a frequency of 1 GHz, 1 core and a usage of 0% may be defined as a benchmark. The CPU performance of the data node may be calculated based on the frequency, the number of the cores and the usage. For example, in one embodiment, the following Equation 5 may be adopted.

$$CPU(\text{data node}) = \frac{\text{frequency}}{1 \text{ GHz}} \times \frac{\text{number of cores}}{1} \times \frac{1 - \text{usage rate}}{100\%} \quad (5)$$

In Equation 5, CPU (data node) indicates the CPU performance of the data node, frequency indicates the frequency supported by the CPU, the number of cores indicates how many cores are deployed in the CPU, and the usage rate indicates the percentage of the power that has been used in the CPU.

Usually, the disks comprised in the data nodes may relate to different interface types. For example, Integrated Drive Electronics (IDE) disks, Small Computer System Interface (SCSI) disks, Serial ATA (SATA) disks, Solid-State Disk (SSD) and the like may be provided in the data node. Each interface type may have a base I/O bandwidth. In the context of the present disclosure, the available I/O bandwidth depends on the interface type of the disk as well as the occupied bandwidth. Accordingly, the available I/O bandwidth may be estimated based on the basic bandwidth and the occupied bandwidth.

For example, the base bandwidth of the SATA device in the data node 520 may be 200 MB/s and the base bandwidth of the SSD device in the data node 530 may be 550 MB/s. Continuing the above example, it is supposed that the SATA disk has an occupied bandwidth of 100 MB/s, and the SSD device has an occupied bandwidth of 100 MB/s, then the available I/O bandwidths of the data nodes 520 and 530 may be calculated as below:

$$IO(\text{data node } 520) = 550 - 100 = 450 \frac{MB}{s}$$

$$IO(\text{data node } 530) = 200 - 100 = 100 \frac{MB}{s}$$

In the above equations, IO (data node 520) indicates the IO performance of the data node 520, which may be determined by the base bandwidth that is support by the data node 520 (for example, 550 MB/s) and the occupied bandwidth that is occupied in the data node 520 (for example, 100 MB/s). Those skilled in the art may determine the IO performance of the data node 530 likewise. Since IO (data node 520)>IO (data node 530) in this example, the data node 520 may be selected, and the data block may be loaded into the first processing module from the data node 520.

Further, the sizes of the available memory in the data nodes may be considered to determine the loading performance indicator. The available memory depends on the basic sizes of the memory and the occupied portion of the memory. For example, the base sizes of the memories in the data nodes 520 and 530 may be 1G and 2G, respectively. If the memory in the data node 520 is occupied by a size of 0.5 G and the memory in the data node 530 is occupied by a size of 1 G, then the available memories of the data nodes 520 and 530 may be calculated as below:

MEM(data node 520)=1−0.5=0.5 G

MEM(data node 530)=2−1=1 G

In the above equations, MEM (data node 520) indicates the memory performance of the data node 520, which may be determined by the size of the memory in the data node 520 (for example, 1 GB) and the size of the occupied memory in the data node 520 (for example, 0.5 GB). Those skilled in the art may determine the memory performance of the data node 530 likewise. Since MEM (data node 520) <MEM (data node 530) in this example, the data node 530 may be selected, and the data block may be loaded into the first processing module from the data node 520.

In one embodiment of the present disclosure, the above three aspects may be considered independently or in a combinational manner. For example, the loading performance indicator may be represented by Equation 6:

Loading Performance Indicator*$\beta_1$*IO+$\beta_2$*CPU+ $\beta_2$*MEM     (6)

Where Loading Performance Indicator indicates the performance for loading the data block, $\beta_1$, $\beta_2$, and $\beta_a$ may be predefined weights for respective aspects, for example, predefined by an administrator of the distributed processing system according to the previous experience. The values of TO, CPU and MEM may be determined according to the definitions described in the preceding paragraphs in the disclosure. Although the above paragraphs illustrate examples for selecting a faster data node from the data nodes 520 and 530, where copies of the data block are stored in more than two data nodes, a faster data node may be selected based on the Equation 6.

In one embodiment of the present disclosure, the data block may be a portion included in a data object that further includes a further data block, a copy of the further data block may be stored in a further data node other than the selected data node, and the further data block may be loaded by reading the copy of the further data node stored in the further data node.

Figure 6:
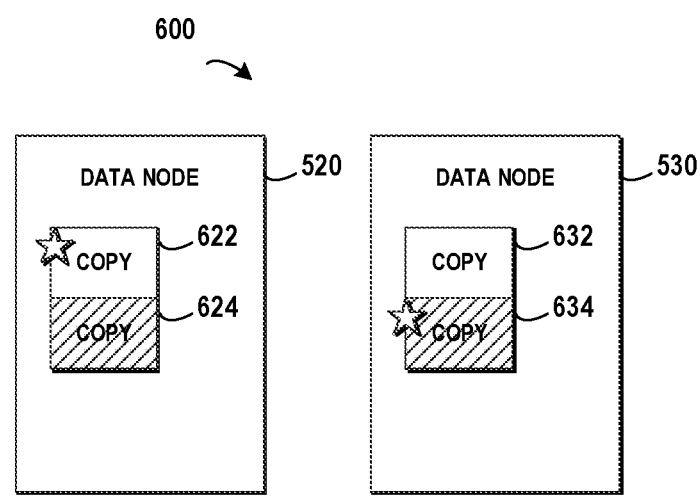
FIG. 6 schematically illustrates a block diagram of data nodes in the distributed storage system with multiple copies of data blocks included in a data object according to one embodiment of the present disclosure.

FIG. 6 schematically illustrates a block diagram of data nodes in the distributed storage system with multiple copies of data blocks included in a data object according to one embodiment of the present disclosure. In this example, the data object includes a first and a second data block, the data node 520 stores a copy 622 of the first data block and a copy 624 of the second data block, and the data node 530 stores a copy 632 of the first data block and a copy 634 of the second data block.

In FIG. 6, as multiple copies of the data blocks in the data object are stored across different data nodes, these data blocks may be loaded from different data nodes. In this example, the copy 622 of the first data block may be loaded from the data node 520, and the copy 634 of the second block may be loaded from the data node 530. At this point, the resources in the different data nodes may be utilized evenly and the heavy workload caused by loading all the data blocks from a single data node may be prevented.

Based on the principle as illustrated in FIG. 6, the loading workload may be distributed among the multiple data nodes. The distributed processing system may be deployed in the multiple data nodes included in the distributed storage system, and thus the loading and processing workload may be distributed among these multiple data nodes to a certain extend. In another embodiment of the present disclosure, if uneven workload is detected among the processing modules, then the loaded data block may be further partitioned into sub-blocks and then the partitioned sub-blocks may be distributed among available processing modules.

In one embodiment of the present disclosure, the data block may be a portion included in a data object that further includes a further data block, the further data block may be loaded into a processing module launched in the distributed processing system, the data block and the further data block may be partitioned into multiple sub-blocks; and multiple processing modules launched in the distributed processing system may be notified to process respective sub-blocks.

Figure 7:
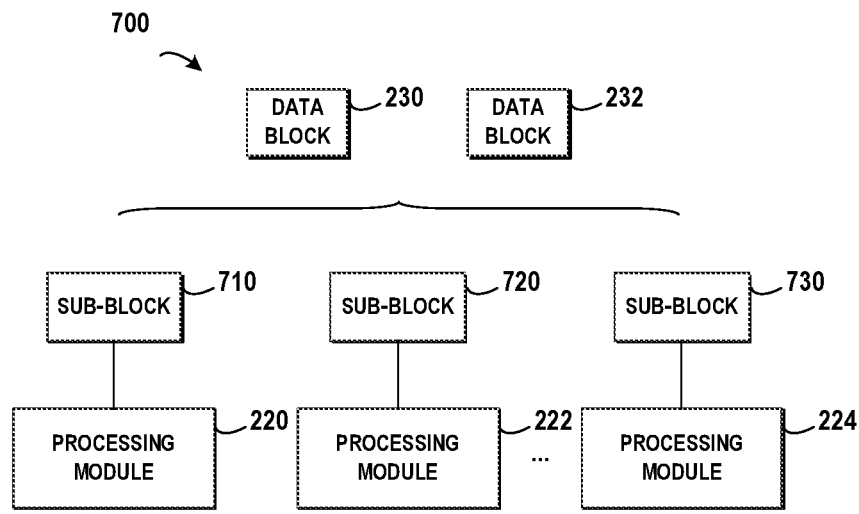
FIG. 7 schematically illustrates a block diagram for partitioning data blocks into multiple sub-blocks across multiple processing modules.

FIG. 7 schematically illustrates a block diagram of partitioning data blocks into multiple sub-blocks across multiple processing modules. As shown in FIG. 7, three processing modules 220, 222 and 224 are launched in the distributed processing system, and two data blocks 230 and 232 are loaded into a processing module (for example, the processing module 220). The partitioning step may be triggered according to a rule predefined in the distributed processing system. In one embodiment, it may be predefined that a preprocessing step may be implemented before the real processing. In the preprocessing step, states of the launched processing modules such as modules 220, 222 and 224 may be collected, and then the distributed processing system may determine how many processing modules will participant in the processing based on the collected states. It is appreciated that the term "partitioning" in the context of the present disclosure has a broad meaning, and it may refer to partitioning a first number of data blocks into a second number of sub-blocks, where the first number may be less than, equal to, or greater than the second number. Details of the partitioning step will be described hereinafter.

For example, if the states show that the processing module 220 is heavily loaded and the processing modules 222 and 224 are in idle states, then the loaded data blocks 220 and 232 may be redistributed to the available processing modules 222 and 224, respectively. As the number of the data blocks is equal to that of the available processing modules, the data blocks may be redistributed to the available processing modules without a real partitioning step. In other words, the original data block itself may be taken as the sub-block.

In another example, if it is determined that two processing modules are heavily loaded and only one processing module is available, then the two data blocks 230 and 232 may be combined into one and the combined data block may be sent to the available processing module.

In still another example, if the states show that all the three processing modules 220, 222 and 224 are in idle states, then as illustrated in FIG. 7, the two loaded data blocks 230 and 232 may be partitioned into three sub-blocks 710, 720 and 730. Next, the processing modules 220, 222 and 224 may be notified to process the sub-blocks respectively. For example, the three sub-blocks may be distributed to the three available processing modules respectively along with the notification. Alternatively, the sub-block may be transmitted to the corresponding processing module in response to a transmitting signal from the corresponding processing module. In this example, the two data blocks are physically partitioned into three sub-blocks, and the sizes of the sub-blocks may be the same or different. Details of how to determine the sizes of the sub-blocks will be determined hereinafter.

In one embodiment of the present disclosure, sizes of the respective sub-blocks may be determined based on at least one of loading performance indicators, processing performance indicators, and transmitting performance indicators of the respective sub-blocks, the sizes of the respective sub-blocks causing overall performance for processing the data block and the further data block meeting a predefine criterion.

The above paragraphs describe that the performance of processing one data block depends on three aspects of the data block: the loading performance, the processing performance and the transmitting performance of the data block. Accordingly, when determining the sizes of the sub-blocks, the method for calculating the loading performance indicators, the processing performance indicators, and transmitting performance indicators may be used in determining the sizes of the sub-blocks. In one embodiment of the present disclosure, one or more indicators may be considered in determining the sizes.

Given that the collected states show there are n available processing modules in the distributed processing system, and there are m data blocks that are to be partitioned across the n available processing modules, where n and m may be natural numbers. At this point, an equation set describing the performance of the available processing modules may be obtained according to the above one or more indicators. By solving a set of sizes that maximizing the performance of processing the m data blocks based on the equation set, the sizes of the sub-blocks may be derived.

Let $DS_i$ represent the size of the $i^{th}$ sub-block that will be assigned to the $i^{th}$ processing module, where may be a natural number. If only the loading performance indicator is considered in calculating the performance, the performance for processing the $i^{th}$ sub-block by the $i^{th}$ processing module may be represented as Equation 7 as below:

$$\text{Performance}_i = DS_i * (\beta_1 * IO_i + \beta_2 * CPU_i + \beta_a * MEM_i) \quad (7)$$

Where Performance$_i$ indicates the performance for processing the $i^{th}$ sub-block by the $i^{th}$ processing module in one example, and the parameters in Equation 7 may be determined according to the definitions described in the preceding paragraphs in the disclosure.

With the above Equation 7, the performance for processing the respective sub-blocks by the respective processing modules may be determined as below:

$$\text{Performance}_1 = DS_1 * (\beta_1 * IO_1 + \beta_2 * CPU_1 + \beta_2 * MEM_1)$$

$$\text{Performance}_2 = DS_2 * (\beta_2 * IO_2 + \beta_2 * CPU_2 + \beta_2 * MEM_2)$$

$$\ldots$$

$$\text{Performance}_n = DS_n * (\beta_1 * IO_n + \beta_2 * CPU_n + \beta_2 * MEM_n) \quad \text{Equation Set 1}$$

Where in the above Equation Set 1, the parameters $DS_1$, $DS_2$, ..., and $DS_n$ are unknown and may be calculated by solving the Equation Set 1 with solutions that maximizing $$\sum_{i=1}^{n} \text{Performance}_i$$

with a constrain that the sum of the sizes of all the partitioned sub-blocks being equal to that of all the original data blocks. In other words, $$\sum_{i=1}^{n} DS_i$$

should be equal to the total size of the m original data blocks.

It is appreciated that the above method considers only one aspect of the performance for processing the sub-block, in another embodiment, two or more aspects may be considered in building the equation set. For example, all the three aspects (the loading performance, the processing performance, and the transmitting performance) may be considered, and thus Equation 7 for may be modified to Equation 8 as below:

$$\text{Performance}_i = DS_i * (\beta_1 * IO_i + \beta_2 * CPU_i + \beta_3 * MEM_i) + \text{Max}[\text{Performance}_{local}, \text{Performance}_{network}] \quad (8)$$

In Equation 8, Performance$_i$ indicates the performance for processing the $i^{th}$ sub-block by the $i^{th}$ processing module in another example, and the operator "Max{Performance$_{local}$, Performance$_{network}$}" refers to selecting from local processing and network processing one manner that may maximize the performance of the distributed processing system. In this equation, the parameter Performance$_{local}$ and Performance$_{network}$ may be determined according to the above Equations 2 and 4, which are associated with the processing performance and the transmitting performance of processing the sub-blocks. Based on Equation 8 for processing the $i^{th}$ sub-block by the $i^{th}$ processing module, those skilled in the art may build a corresponding equation set. Further, by solving this equation set in a similar manner like solving Equation Set 1, the values of $DS_1$, $DS_2$, ..., and $DS_n$ may be determined and then the m original data blocks may be partitioned into n sub-blocks and then transmitted to the n available processing modules.

It is appreciated that the above Equations 1-8 are examples for describing the performance of the distributed processing system, and those skilled in the art may modify these Equations 1-8 according to the specific environment of the implementation. For example, the performance may be represented by various parameters and thus the equations may be modified accordingly. In one example, the performance may be indicated by the time cost for processing the data block, thereby maximizing the total performance of all the processing modules may be interrupted as minimizing the time cost. In this example, the operator Max{Performance$_{local}$, Performance$_{network}$} in the Equation 8 may be modified to Min{TimeCost$_{local}$, TimeCost$_{network}$}.

In one embodiment of the present disclosure, the data block may be a portion included in a data object, and a processed result of the data object may be generated based on at least the processed data block. In this embodiment, the respective processed results at the respective processing modules may be merged into a final result of the data object.

Figure 8:
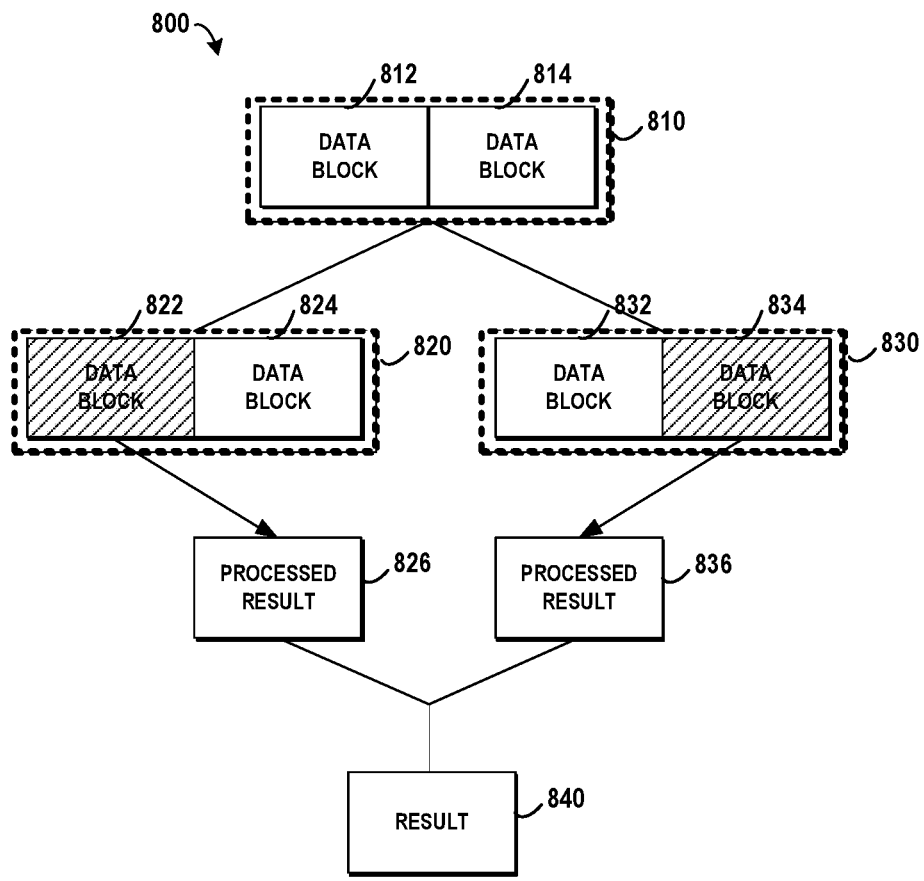
FIG. 8 schematically illustrates a block diagram for integrating processed results of multiple data blocks into a final result according to one embodiment of the present disclosure.

FIG. 8 schematically illustrates a block diagram for integrating processed results of multiple data blocks into a final result according to one embodiment of the present disclosure.

The following paragraphs will describe details of FIG. 8 by an example of calculating a production quantity of all the workers in a factory. For example, there are 1000 workers in the factory, and the production quantity of the 1000 workers is recorded in a data object 810, which includes a data block 812 for recording the production quantity of the first 500 workers and a data block 814 for recording the production quantity of the second 500 workers. Further, a first copy 820 (including data blocks 822 and 824) of the data object 810 is stored in a first data node of a distributed storage system (not illustrated) and a second copy 830 (including data blocks 832 and 834) of the data object 810 is stored in a second data node of the distributed storage system.

With the principle as described in the previous paragraphs of the present disclosure, the data block 822 may be processed by a first processing module launched in a distributed processing system (not illustrated), and the data block 834 may be processed by a second processing module launched in the distributed processing system. In this example, the first processing module may calculate a sum of the production quantity for the first 500 workers and generates the processed result 826, and the second processing module may calculate a sum of the production quantity for the second 500 workers and generates the processed result 836. Afterwards, the processed results 826 and 836 from data blocks 822 and 834 respectively may be combined to generate a final result 840. As illustrated in FIG. 8, the processed results 826 and 836 may be added up to obtain the total sum of the production quantity of the 1000 workers in the factory.

It is appreciated that FIG. 8 illustrates a simple example of generating the final result from the results at two processing modules, in another embodiment, the data object may include more data blocks (for example, 1000 data blocks) and these data blocks may be processed at a plurality processing modules (for example, 10 processing modules). Then, the 1000 processed results at 10 processing modules may be merged into a final result.

In one embodiment of the present disclosure, the distributed processing system may be a Spark system. In one embodiment of the present disclosure, the processing module may be a Worker initiated in the Spark system. The Apache® Spark is a newly developed distributed processing system and it provides an application programming interface centered on a data structure called the Resilient Distributed Dataset (RDD). It was developed in response to limitations in the MapReduce cluster computing paradigm, which forces a particular linear dataflow structure on distributed programs.

Apache Spark requires a cluster manager and a distributed storage system. For cluster management, Spark supports standalone (native Spark cluster), Hadoop YARN, or Apache Mesos. For distributed storage, Spark can interface with a wide variety, including Hadoop Distributed File System (HDFS), MapR File System (MapR-FS), and so on. Although embodiments of the present disclosure are described in the Spark environment for illustration, it is appreciated that these embodiments may be implemented in any distributed processing system, as long as the workload needs to be balanced among the multiple processing modules.

The present disclosure may be a system, a method, and/or a computer program product. The computer program product may include a computer readable storage medium (or media) having computer readable program instructions thereon for causing a processor to carry out aspects of the present disclosure.

In one embodiment of the present disclosure, there is provided a computing system. The computing system comprises a computer processor coupled to a computer-readable memory unit, the memory unit comprising instructions that when executed by the computer processor implements a method. In the method, a first performance indicator for processing a data block by a first processing module is obtained, where the data block is loaded into the first processing module. Then, a second performance indicator for processing the data block by a second processing module is obtained, the first and second processing modules being logical instances launched in a distributed processing system for processing data blocks. Next, one processing module is selected from the first and second processing modules for processing the data block based on a relationship between the first and second performance indicators.

In one embodiment of the present disclosure, the first performance indicator may be calculated based on a processing performance indicator of the data block, and the processing performance indicator may be associated with at least one of a size of the data block and a complexity of operations included in processing the data block.

In one embodiment of the present disclosure, the second performance indicator may be calculated based on the processing performance indicator and a transmitting performance indicator of the data block, and the transmitting performance indicator may be associated with performance for transmitting the data block to a processing module by which the data block is to be processed.

In one embodiment of the present disclosure, a plurality of data nodes that store copies of the data block may be identified. Then, a data node with a loading performance indicator better than that of at least one of remaining data nodes in the plurality of data nodes may be selected from the plurality of data nodes. Next, the data block may be loaded into the first processing module by reading a copy of the data node stored in the selected data node.

In one embodiment of the present disclosure, the loading performance indicator may be associated with at least one of an Input/Output state, a memory state, and a CPU state of a data node in which a copy of the data block is stored.

In one embodiment of the present disclosure, the data block may be a portion included in a data object that includes a further data block, and a copy of the further data block may be stored in a further data node other than the selected data node. In the method, the further data block may be loaded by reading the copy of the further data node stored in the further data node.

In one embodiment of the present disclosure, the data block may be a portion included in a data object that includes a further data block, and the further data block may be loaded into a processing module launched in the distributed processing system. in the method, the data block and the further data block may be partitioned into multiple sub-blocks, and then multiple processing modules launched in the distributed processing system may be notified to process respective sub-blocks.

In one embodiment of the present disclosure, sizes of the respective sub-blocks may be determined based on at least one of loading performance indicators, processing performance indicators, and transmitting performance indicators of the respective sub-blocks, thereby the sizes of the respective sub-blocks may cause overall performance for processing the data block and the further data block meeting a predefine criterion.

In one embodiment of the present disclosure, the data block may be a portion included in a data object, and a processed result of the data may be generated object at least based on the processed data block.

In one embodiment of the present disclosure, there is provided a computer program product being tangibly stored on a non-transient machine-readable medium and comprising machine-executable instructions, the instructions, when executed on an electronic device, causing the electronic device to: obtain a first performance indicator for processing a data block by a first processing module, the data block being loaded into the first processing module; obtain a second performance indicator for processing the data block by a second processing module, the first and second processing modules being logical instances launched in a distributed processing system for processing data blocks; and select one from the first and second processing modules for processing the data block based on a relationship between the first and second performance indicators.

In one embodiment of the present disclosure, the instructions may further cause the electronic device to calculate the first performance indicator based on a processing performance indicator of the data block, where the processing performance indicator may be associated with at least one of a size of the data block and a complexity of operations included in processing the data block.

In one embodiment of the present disclosure, the instructions may further cause the electronic device to calculate the second performance indicator based on the processing performance indicator and a transmitting performance indicator of the data block, where the transmitting performance indicator may be associated with performance for transmitting the data block to a processing module by which the data block is to be processed.

In one embodiment of the present disclosure, the instructions may further cause the electronic device to identify a plurality of data nodes that store copies of the data block; select from the plurality of data nodes a data node with a loading performance indicator better than that of at least one of remaining data nodes in the plurality of data nodes; and load the data block into the first processing module by reading a copy of the data node stored in the selected data node.

In one embodiment of the present disclosure, the loading performance indicator may be associated with at least one of an Input/Output state, a memory state, and a CPU state of a data node in which a copy of the data block is stored.

In one embodiment of the present disclosure, the data block may be a portion included in a data object that includes a further data block, a copy of the further data block is stored in a further data node other than the selected data node. The instructions may further cause the electronic device to load the further data block by reading the copy of the further data node stored in the further data node.

In one embodiment of the present disclosure, the data block may be a portion included in a data object that includes a further data block, the further data block being loaded into a processing module launched in the distributed processing system. The instructions may further cause the electronic device to partition the data block and the further data block into multiple sub-blocks; and notify multiple processing modules launched in the distributed processing system to process respective sub-blocks.

In one embodiment of the present disclosure, the instructions may further cause the electronic device to determine sizes of the respective sub-blocks based on at least one of loading performance indicators, processing performance indicators, and transmitting performance indicators of the respective sub-blocks, thereby the sizes of the respective sub-blocks may cause overall performance for processing the data block and the further data block meeting a predefine criterion.

In one embodiment of the present disclosure, the data block is a portion included in a data object. The instructions may further cause the electronic device to generate a processed result of the data object at least based on the processed data block.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method, comprising:

receiving a request to execute a data processing task on a data object to generate a final result, the data object comprises a plurality of data blocks, and the data processing task comprises performing a computation on the data object to generate the final result;

obtaining a first performance indicator indicative of a first cost, the first cost is a cost to use a first processing module to perform the computation of the data processing task on a particular data block loaded into the first processing module, wherein using the first processing module to perform the computation of the data processing task on the particular block excludes transmitting the particular data block from the first processing module to another processing module based on the particular data block being loaded into the first processing module, the first cost excludes a processing cost of the transmission of the particular data block from the first processing module to another processing module, wherein the particular data block is among the plurality of data blocks, and the computation of the data processing task on the particular data block results in generation of a temporary result, the temporary result is a portion of the final result;

obtaining a second performance indicator indicative of a second cost, the second cost is a cost to use a second processing module to perform the computation of the data processing task on the particular data block loaded into the first processing module to generate the temporary result, wherein the first and second processing modules being logical instances launched in a distributed processing system for processing the plurality of data blocks, wherein using the second processing module to perform the computation on the particular data block includes a transmission of the particular data block from the first processing module to the second processing module, and the second cost includes a processing cost of the transmission of the particular data block from the first processing module to the second processing module;

selecting one from the first and second processing modules for performing the computation of the data processing task on the particular data block loaded into the first processing module to generate the temporary result, wherein the selecting is based on a relationship between the first and second performance indicators;

controlling the selected processing module to perform the computation of the data processing task on the particular data block to generate the temporary result; and aggregating the temporary result to other temporary results generated by other processing modules launched in the distributed processing system to generate the final result.

2. The method of claim 1, wherein obtaining the first performance indicator comprises calculating the first performance indicator based on a processing performance indicator of the data block, the processing performance indicator being associated with at least one of a size of the data block and a complexity of operations included in processing the data block.

3. The method of claim 2, wherein obtaining the second performance indicator comprises calculating the second performance indicator based on the processing performance indicator and a transmitting performance indicator of the data block, the transmitting performance indicator being associated with performance for transmitting the data block to a processing module by which the data block is to be processed.

4. The method of claim 1, further comprising:
identifying a plurality of data nodes that store copies of the data block;
selecting from the plurality of data nodes a data node with a loading performance indicator better than at least one of remaining data nodes in the plurality of data nodes; and
loading the data block into the first processing module by reading a copy of the data node stored in the selected data node.

5. The method of claim 4, wherein the loading performance indicator being associated with at least one of an Input/Output state, a memory state, and a CPU state of a data node in which a copy of the data block is stored.

6. The method of claim 4, wherein the data block is a portion included in a data object that includes a further data block, a copy of the further data block is stored in a further data node other than the selected data node, the method further comprises:
loading the further data block by reading the copy of the further data node stored in the further data node.

7. The method of claim 3, wherein the data block is a portion included in a data object that includes a further data block, the further data block being loaded into a processing module launched in the distributed processing system, the method further comprises:
partitioning the data block and the further data block into multiple sub-blocks; and
notifying multiple processing modules launched in the distributed processing system to process respective sub-blocks.

8. The method of claim 7, wherein partitioning the data block and the further data block comprises:
determining sizes of the respective sub-blocks based on at least one of loading performance indicators, processing performance indicators, and transmitting performance indicators of the respective sub-blocks, the sizes of the respective sub-blocks causing overall performance for processing the data block and the further data block meeting a predefine criterion.

9. A computing system comprising a computer processor coupled to a computer-readable memory unit, the memory unit comprising instructions that when executed by the computer processor implements a method comprising:
receiving a request to execute a data processing task on a data object to generate a final result, the data object comprises a plurality of data blocks, and the data processing task comprises performing a computation on the data object to generate the final result;
obtaining a first performance indicator indicative of a cost to use a first processing module to perform the computation of the data processing task on a particular data block loaded into the first processing module, wherein using the first processing module to perform the computation of the data processing task on the particular block excludes without transmitting the particular data block from the first processing module to another processing module based on the particular data block being loaded into the first processing module, the first cost excludes a processing cost of the transmission of the particular data block from the first processing module to another processing module, wherein the particular data block is among the plurality of data blocks, and the computation of the data processing task on the particular data block results in generation of a temporary result, the temporary result is a portion of the final result;
obtaining a second performance indicator indicative of a cost to use a second processing module to perform the computation of the data processing task on the particular data block loaded into the first processing module to generate the temporary result, wherein the first and second processing modules being logical instances launched in a distributed processing system for processing the plurality of data blocks, wherein using the second processing module to perform the computation on the particular data block includes a transmission of the particular data block from the first processing module to the second processing module, and the second cost includes a processing cost of the transmission of the particular data block from the first processing module to the second processing module;
selecting one from the first and second processing modules for performing the computation of the data processing task on the particular data block loaded into the first processing module to generate the temporary result, wherein the selecting is based on a relationship between the first and second performance indicators;
controlling the selected processing module to perform the computation of the data processing task on the particular data block loaded into the first processing module to generate the temporary result; and
aggregating the temporary result to other temporary results generated by other processing modules launched in the distributed processing system to generate the final result.

10. The system of claim 9, wherein obtaining the first performance indicator comprises calculating the first performance indicator based on a processing performance indicator of the data block, the processing performance indicator being associated with at least one of a size of the data block and a complexity of operations included in processing the data block.

11. The system of claim 10, wherein obtaining the second performance indicator comprises calculating the second performance indicator based on the processing performance indicator and a transmitting performance indicator of the data block, the transmitting performance indicator being associated with performance for transmitting the data block to a processing module by which the data block is to be processed.

12. The system of claim 9, wherein the method further comprises:
   identifying a plurality of data nodes that store copies of the data block;
   selecting from the plurality of data nodes a data node with a loading performance indicator better than that of at least one of remaining data nodes in the plurality of data nodes; and
   loading the data block into the first processing module by reading a copy of the data node stored in the selected data node.

13. The system of claim 12, wherein the loading performance indicator being associated with at least one of an Input/Output state, a memory state, and a CPU state of a data node in which a copy of the data block is stored.

14. The system of claim 12, wherein the data block is a portion included in a data object that includes a further data block, a copy of the further data block is stored in a further data node other than the selected data node, the method further comprises:
   loading the further data block by reading the copy of the further data node stored in the further data node.

15. The system of claim 9, wherein the data block is a portion included in a data object that includes a further data block, the further data block being loaded into a processing module launched in the distributed processing system, the method further comprises:
   partitioning the data block and the further data block into multiple sub-blocks; and
   notifying multiple processing modules launched in the distributed processing system to process respective sub-blocks.

16. The system of claim 15, wherein partitioning the data block and the further data block comprises:
   determining sizes of the respective sub-blocks based on at least one of loading performance indicators, processing performance indicators, and transmitting performance indicators of the respective sub-blocks, the sizes of the respective sub-blocks causing overall performance for processing the data block and the further data block meeting a predefine criterion.

17. A computer program product being tangibly stored on a non-transitory computer readable storage medium and comprising machine-executable instructions, the instructions, when executed on an electronic device, causing the electronic device to:
   receive a request to execute a data processing task on a data object to generate a final result, the data object comprises a plurality of data blocks, and the data processing task comprises performing a computation on the data object to generate the final result;
   obtain a first performance indicator indicative of a cost to use a first processing module to perform the computation of the data processing task on a particular data block loaded into the first processing module, wherein using the first processing module to perform the computation of the data processing task on the particular block excludes transmitting the particular data block from the first processing module to another processing module based on the particular data block being loaded into the first processing module, the first cost excludes a processing cost of the transmission of the particular data block from the first processing module to another processing module, wherein the particular data block is among the plurality of data blocks, and the computation of the data processing task on the particular data block results in generation of a temporary result, the temporary result is a portion of the final result, wherein using the first processing module to perform the computation on the particular data block does not includes a transmission of the particular data block from the first processing module to another processing module;
   obtain a second performance indicator indicative of a cost to use a second processing module to perform the computation of the data processing task on the particular data block loaded into the first processing module to generate the temporary result, wherein the first and second processing modules being logical instances launched in a distributed processing system for processing the plurality of data blocks, wherein using the second processing module to perform the computation on the particular data block requires a transmission of the particular data block from the first processing module to the second processing module, and the second cost includes a processing cost of the transmission of the particular data block from the first processing module to the second processing module;
   select one from the first and second processing modules for performing the computation of the data processing task on the particular data block loaded into the first processing module to generate the temporary result, wherein the selection is based on a relationship between the first and second performance indicators;
   control the selected processing module to perform the computation of the data processing task on the particular data block loaded into the first processing module to generate the temporary result; and
   aggregate the temporary result to other temporary results generated by other processing modules launched in the distributed processing system to generate the final result.

18. The computer program product of claim 17, the instructions further causing the electronic device to: calculating the first performance indicator based on a processing performance indicator of the data block, the processing performance indicator being associated with at least one of a size of the data block and a complexity of operations included in processing the data block.

19. The computer program product of claim 18, the instructions further causing the electronic device to: calculating the second performance indicator based on the processing performance indicator and a transmitting performance indicator of the data block, the transmitting performance indicator being associated with performance for transmitting the data block to a processing module by which the data block is to be processed.

* * * * *